United States Patent Office 2,847,472
Patented Aug. 12, 1958

2,847,472

CONDENSATION PRODUCTS OF 2,3-DICHLORO-ANILINE AND A BENZALDEHYDE COMPOUND

Dale N. Robertson, Midland, Mich., assignor to The Dow Chemical Company, Midland, Mich., a corporation of Delaware No Drawing. Application April 10, 1957
Serial No. 651,813

3 Claims. (Cl. 260—566)

The present invention relates to new compounds which are condensation products of 2,3-dichloroaniline with a benzaldehyde compound. The new compounds are characterized by the formula

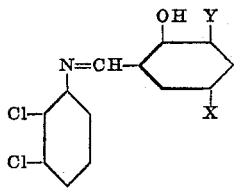

In this and succeeding formulae, X and Y each represent hydrogen or chlorine and when Y is chlorine X is chlorine. The compounds are crystalline solids somewhat soluble in many organic solvents and of low solubility in water. They are useful as antimicrobials and are adapted to be employed as active constituents of disinfectant and germicidal compositions for the control of many bacterial and fungal organisms, such as *Salmonella typhosa*, *Staphylococcus aureus*, *Aspergillus terreus*, *Rhizopus nigricans*, and the like.

The new compounds may be prepared by condensing 2,3-dichloraniline with a benzaldehyde compound having the following formula

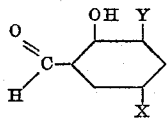

The condensation may be carried out in the presence of an inert organic solvent such as alcohol or benzene. The amount of reactants to be employed is not critical, some of the desired product being produced with any proportion of ingredients. Optimum yields are usually obtained when employing substantially equimolecular proportions of the reactants. The reaction is somewhat exothermic and proceeds smoothly at the temperature range of from 10° to 140° C. with the formation of the desired product and water of reaction.

In carrying out the reaction, the 2,3-dichloroaniline and benzaldehyde compound are mixed or otherwise blended together and the resulting mixture maintained at the contacting temperature range for a period of time to assure completion of the reaction. During the reaction, the desired product oftentimes precipitates in the reaction mixture as a crystalline solid. Upon completion of the reaction, the reaction mixture may be cooled to precipitate the desired product as a crystalline solid or to precipitate further product. The product may be separated in conventional manner such as by filtration or decantation and thereafter purified by recrystallization from a suitable organic solvent.

In an alternative procedure, contacting of the reactants may be carried out in an inert organic solvent. When operating in accordance with such procedure, the reaction conveniently is carried out in a solvent such as benzene or toluene and at the boiling temperature of the reacting mixture. Upon completion of the reaction, the reaction mixture may be cooled and the desired product separated as previously described.

The following examples illustrate the invention but are not to be construed as limiting the same.

*Example 1.—4,6-dichloro-α-(2,3-dichlorophenylimino)-o-cresol*

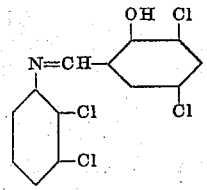

2,3-dichloroaniline (8.1 grams; 0.05 mole) was dispersed in 9.6 grams (0.05 mole) of 3,5-dichlorosalicylaldehyde dissolved in 100 milliliters of ethanol. The resulting mixture solidified almost immediately. The solid was separated by filtration to obtain a 4,6-dichloro-α-(2,3-dichlorophenylimino)-o-cresol product as a crystalline solid. This product was recrystallized from dioxan, washed with alcohol, dried and found to melt at 186°–187° C.

*Example 2.—α-(2,3-dichlorophenylimino)-o-cresol*

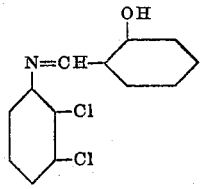

2,3-dichloroaniline (8.1 grams; 0.05 mole) was dispersed in 6.1 grams (0.05 mole) of salicylaldehyde dissolved in 20 milliliters of ethanol and the resulting mixture maintained at a temperature just below the boiling temperature of the reaction mixture (78° C.) and under reflux for one hour. The reaction mixture was thereafter set aside to cool to room temperature. During the cooling, an α - (2,3 - dichlorophenylimino) - o - cresol product precipitated in the reaction mixture as a crystalline solid and was separated by filtration. This product was washed with alcohol, dried and found to melt at 85°–87° C.

*Example 3.—4-chloro-α-(2,3-dichlorophenylimino)-o-cresol*

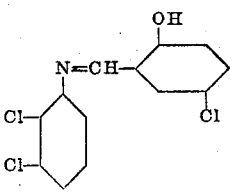

2,3-dichloroaniline (8.1 grams; 0.05 mole) is dispersed in 7.8 grams (0.05 mole) of 5-chloro-2-hydroxybenzaldehyde dissolved in 100 milliliters of benzene and the resulting mixture heated at the boiling temperature. During the heating, a mixture of benzene and water of reaction is continuously distilled out of the reaction zone, the water separated and the benzene returned to the reaction mixture. Upon the substantial cessation of the formation of water of reaction, the reaction mixture is cooled to room temperature. During the cooling, a 4-chloro-α-(2,3-dichlorophenylimino)-o-cresol product precipitates in the mixture as a crystalline solid, and is separated by filtration. 4-chloro-α-(2,3-dichlorophenylimino)-o-cresol has a molecular weight of 300.5.

The new α-(2,3-dichlorophenylimino)-o-cresol compounds have been tested and found to be effective as antimicrobials. For such use, the products may be dispersed on an inert finely divided solid and employed as dusts. Also, such mixtures may be dispersed in water with the aid of a wetting agent, and the resulting aqueous dispersions employed as sprays. In other procedures, the products may be employed as constituents of oil-in-water emulsions, or water dispersions with or without the addition of wetting, dispersing or emulsifying agents.

In representative operations, 4,6-dichloro-α-(2,3-dichlorophenylimino)-o-cresol was incorporated in a nutrient agar medium in an amount sufficient to supply 0.05 percent by weight of toxicant. Portions of the medium were then inoculated with one of the organism *Salmonella typhosa*, *Staphylococcus aureus*, *Aspergillus terreus* and *Rhizopus nigricans*, and the inoculated media incubated at 30° C. After three days of incubation, observations showed that the cresol compound had given a complete control of the growth of each of the test organisms.

I claim:
1. A compound selected from the group consisting of α-(2,3-dichlorophenylimino)-o-cresol, 4-chloro-α-(2,3-dichlorophenylimino)-o-cresol, and 4,6-dichloro-α-(2,3-dichlorophenylimino)-o-cresol.
2. 4,6-dichloro-α-(2,3-dichlorophenylimino)-o-cresol.
3. α-(2,3-dichlorophenylimino)-o-cresol.

References Cited in the file of this patent

UNITED STATES PATENTS

| | | |
|---|---|---|
| 2,418,747 | Bavley | Apr. 8, 1947 |
| 2,583,729 | Deanesly | Jan. 29, 1952 |

OTHER REFERENCES

Roberts et al.: J. Chem. Soc. (London), 1927, pp. 1832–57 (pp. 1833 and 1843 relied on).

Senier et al.: J. Chem. Soc. (London), vol. 95, pp. 1943–55 (1909), p. 1946 relied on.